US007845706B2

(12) United States Patent
Watanabe et al.

(10) Patent No.: US 7,845,706 B2
(45) Date of Patent: Dec. 7, 2010

(54) ELECTRIC ACTUATOR OF AUTOMOTIVE PIVOTAL DOOR

(75) Inventors: Hirofumi Watanabe, Yamanashi (JP); Takuya Kakumae, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 464 days.

(21) Appl. No.: 11/889,567

(22) Filed: Aug. 14, 2007

(65) Prior Publication Data

US 2008/0168714 A1 Jul. 17, 2008

(30) Foreign Application Priority Data

Jan. 12, 2007 (JP) ............................ 2007-004118

(51) Int. Cl.
*B60J 5/10* (2006.01)

(52) U.S. Cl. .................... 296/146.8; 296/56; 296/146.4

(58) Field of Classification Search ................... 296/56, 296/146.4, 146.8; 49/341
See application file for complete search history.

(56) References Cited

U.S. PATENT DOCUMENTS

| | | | | |
|---|---|---|---|---|
| 4,286,820 | A * | 9/1981 | McGaughey | 296/146.8 |
| 6,382,706 | B2 * | 5/2002 | Yuge et al. | 296/146.4 |
| 6,513,859 | B2 * | 2/2003 | Yuge | 296/146.4 |
| 6,676,190 | B2 * | 1/2004 | Daniels et al. | 296/106 |
| 6,964,449 | B2 * | 11/2005 | Takeda et al. | 296/146.4 |
| 7,014,248 | B2 * | 3/2006 | Yokota et al. | 296/146.4 |
| 7,069,695 | B2 * | 7/2006 | Hattori et al. | 49/341 |
| 7,159,927 | B2 * | 1/2007 | Ihashi et al. | 296/146.8 |
| 7,201,430 | B2 * | 4/2007 | Sakai et al. | 296/146.8 |
| 7,243,976 | B2 * | 7/2007 | Okada et al. | 296/146.4 |
| 2005/0001444 | A1 * | 1/2005 | Sakai et al. | 296/56 |
| 2005/0275237 | A1 * | 12/2005 | Sakai et al. | 296/57.1 |

FOREIGN PATENT DOCUMENTS

| | | | |
|---|---|---|---|
| EP | 1 116 850 | A2 | 7/2001 |
| JP | 2003-106044 | A | 4/2003 |
| JP | 2003-336441 | A | 11/2003 |

* cited by examiner

*Primary Examiner*—Glenn Dayoan
*Assistant Examiner*—Gregory Blankenship
(74) *Attorney, Agent, or Firm*—Foley & Lardner LLP

(57) ABSTRACT

A case is mounted to one of a motor vehicle and a pivotal door and has therein a gear receiving space. An electric motor is mounted to the case. A speed reduction mechanism is installed in the gear receiving space of the case and driven by the electric motor. An output gear is rotatably received in the gear receiving space of the case and driven by the speed reduction mechanism. An output arm is placed above the case and connected to the output gear through an output shaft that passes through an upper wall portion of the case. A connecting rod has one end pivotally connected to the output arm and the other end pivotally connected to the other of the motor vehicle and the pivotal door. The connecting rod is arranged beside the case in a manner to avoid overlapping thereof with the case in a direction that is perpendicular to a direction in which the connecting rod is moved by the output arm.

5 Claims, 3 Drawing Sheets

ELECTRIC ACTUATOR OF AUTOMOTIVE PIVOTAL DOOR

BACKGROUND OF THE INVENTION

1. Field of the Invention

The present invention relates in general to electric actuators for opening/closing an automotive door, and more particularly to the electric actuators of a type that, with the aid of power of an electric motor, opens and closes a back door that is pivotally connected to an open back end of a vehicle body.

2. Description of the Related Art

One of the electric actuators of the above-mentioned type is disclosed in Japanese Laid-open Patent Application (Tokkai) 2003-106044. The electric actuator of this publication is mounted in a roof structure of a vehicle body and generally comprises an electric motor and a connecting rod actuated by the electric motor to move in a fore-and-aft direction. A rear end of the connecting rod is pivotally connected to a pivotal back door, so that the fore-and-aft movement of the connecting rod produced by the electric motor induces closing and opening pivotal movements of the back door.

However, due to an inherent construction thereof, the above-mentioned electric actuator fails to have a sufficiently compact size. That is, in the electric actuator of the publication, the connecting rod is arranged to move beneath or below a base mechanism of the electric actuator, and thus the electric actuator has entirely a thicker construction. As is known, such thicker construction makes installation of the electric actuator in the roof structure rather difficult and tends to cause unsightly projection of a ceiling (or lower wall of the roof structure) into a passenger room.

SUMMARY OF THE INVENTION

It is therefor an object of the present invention to provide an electric actuator of an automotive pivotal door, which is free of the above-mentioned drawback.

That is, in accordance with the present invention, there is provided an electric actuator of an automotive pivotal door, which is compact in size, particularly thin in construction.

In accordance with a first aspect of the present invention, there is provided an electric actuator for actuating a pivotal door of a motor vehicle, which comprises a case mounted to one of the motor vehicle and the pivotal door, the case having therein a gear receiving space; an electric motor mounted to the case; a speed reduction mechanism installed in the gear receiving space of the case and driven by the electric motor; an output gear rotatably received in the gear receiving space of the case and driven by the speed reduction mechanism; an output arm placed above the case and connected to the output gear through an output shaft that passes through an upper wall portion of the case; a connecting rod having one end pivotally connected to the output arm and the other end pivotally connected to the other of the motor vehicle and the pivotal door, wherein the connecting rod is arranged beside the case in a manner to avoid overlapping thereof with the case in a direction that is perpendicular to a direction in which the connecting rod is moved by the output arm.

In accordance with a second aspect of the present invention, there is provided an electric actuator for actuating a driven member with an electric power, which comprises a case including upper and lower wall portions that are coupled to constitute a gear housing structure; an electric motor mounted to the case; a speed reduction mechanism installed in the gear housing structure and driven by the electric motor; an output gear rotatably received in the gear housing structure and driven by the speed reduction mechanism; an output arm placed above the case and connected to the output gear through a shaft that passes through the upper wall portion; and a connecting rod having one end pivotally connected to the output arm, the other end of the connecting rod being adapted to pivotally connect to the driven member, wherein the connecting rod is arranged beside the case in a manner to avoid overlapping thereof with the case in a direction that is perpendicular to a direction in which the connecting rod is moved by the output arm.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the drawings.

For ease of understanding, various directional terms such as right, left, upper, lower, rightward and the like will be used in the following description. However, such terms are to be understood with respect to only a drawing or drawings on which a corresponding element or part is shown.

Figure 1:
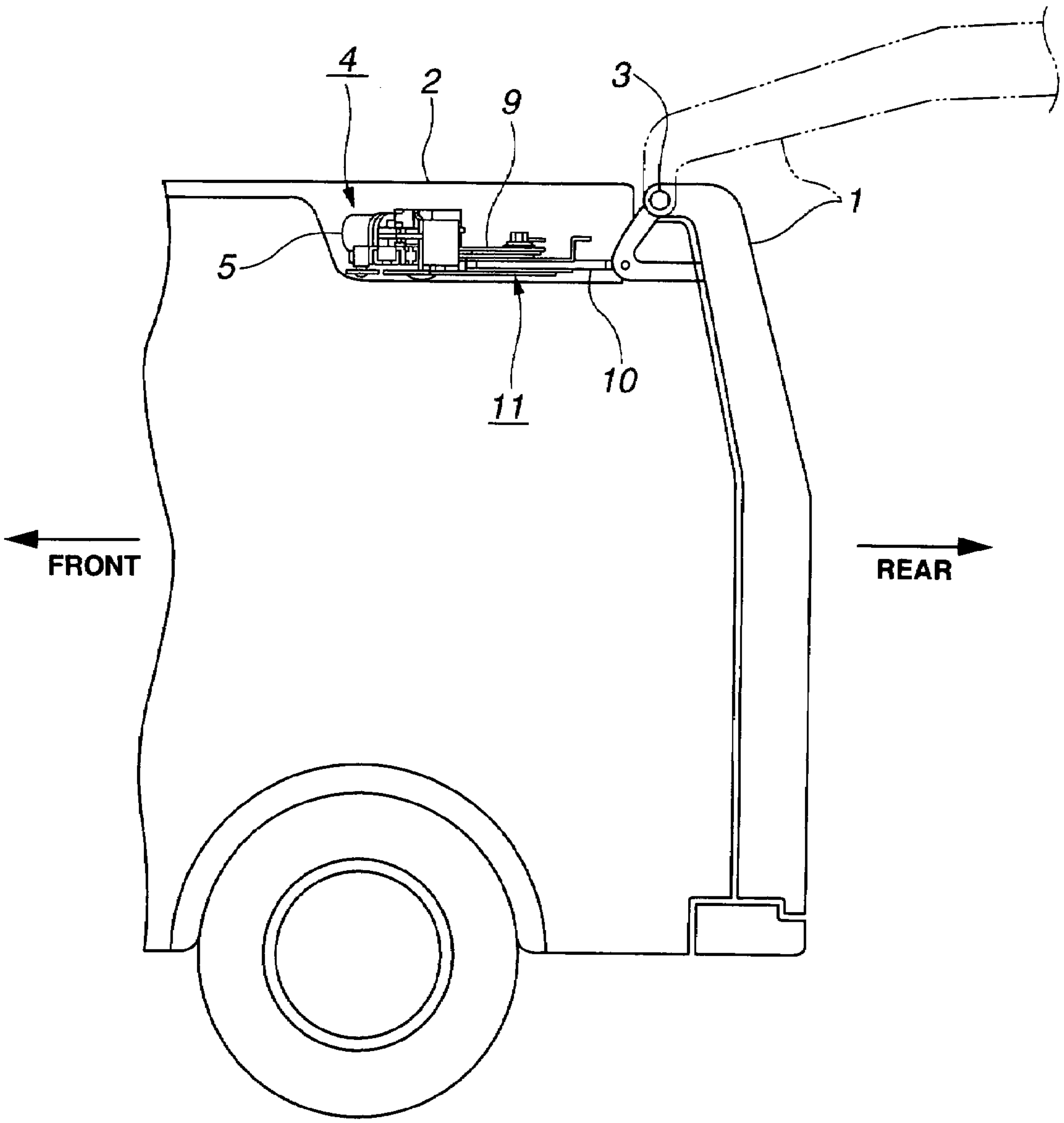
FIG. 1 is a sectional view of a rear portion of a motor vehicle, to which an electric actuator of the present invention is practically applied for opening and closing a pivotal back door of the vehicle.

Referring to FIG. 1, there is shown a rear portion of a motor vehicle to which an electric actuator 4 of the present invention is practically applied for actuating or opening/closing a pivotal back door 1 that is pivotally connected at its upper end to an upper part of a rear open end of the vehicle body.

As shown, for the pivotal connection of the back door 1 to the vehicle body, upper side portions of the back door 1 are pivotally held by respective hinge shafts 3 that are fixed to side portions of a roof structure 2 of the vehicle body. Thus, the back door 1 swings about a common axis of the hinge shafts 3 between a full-closed position as shown by a solid line to close the rear opening of the vehicle body and a full-open position as shown by a phantom fine to fully open the rear opening of the vehicle body. In the illustrated example, for establishing the full-open position, the back door 1 is pivoted up and kept in a horizontal posture, as shown.

As will be described in detail in the following, the electric actuator 4 functions to move the pivotal back door 1 between the full-closed position and full-open position with the aid of a power produced by an electric motor 5.

As shown in FIG. 1, within the roof structure 2, there is installed the electric actuator 4. Although not well shown in the drawing, the electric actuator 4 is placed at a rear-left side of the roof structure 2 when viewed from a position behind the rear of the vehicle body. That is, the electric actuator 4 is arranged to pull and push only a left side of the pivotal back door 1.

Figure 2:
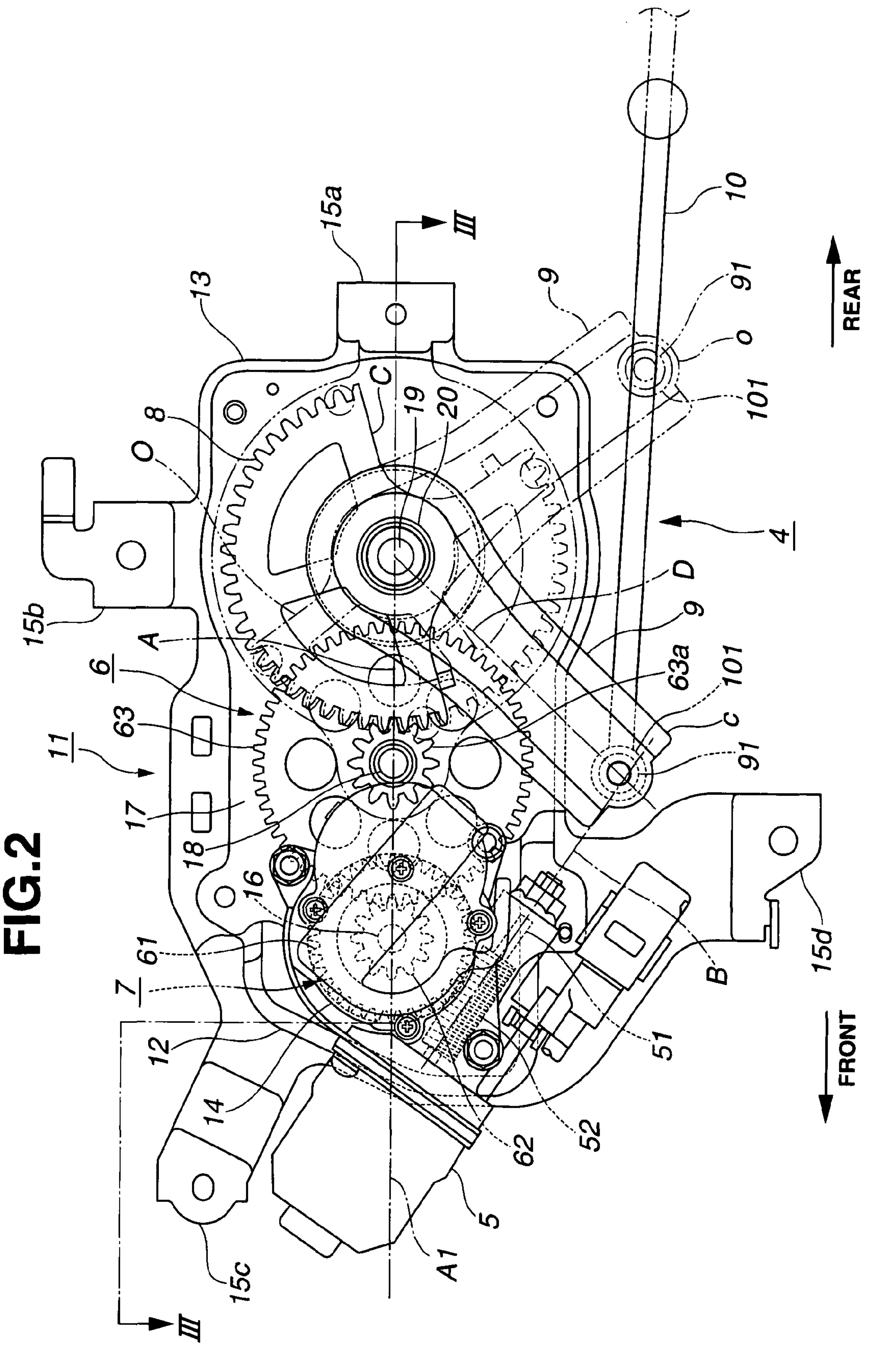
FIG. 2 is a partially cut plan view of the electric actuator of the present invention.
Figure 3:
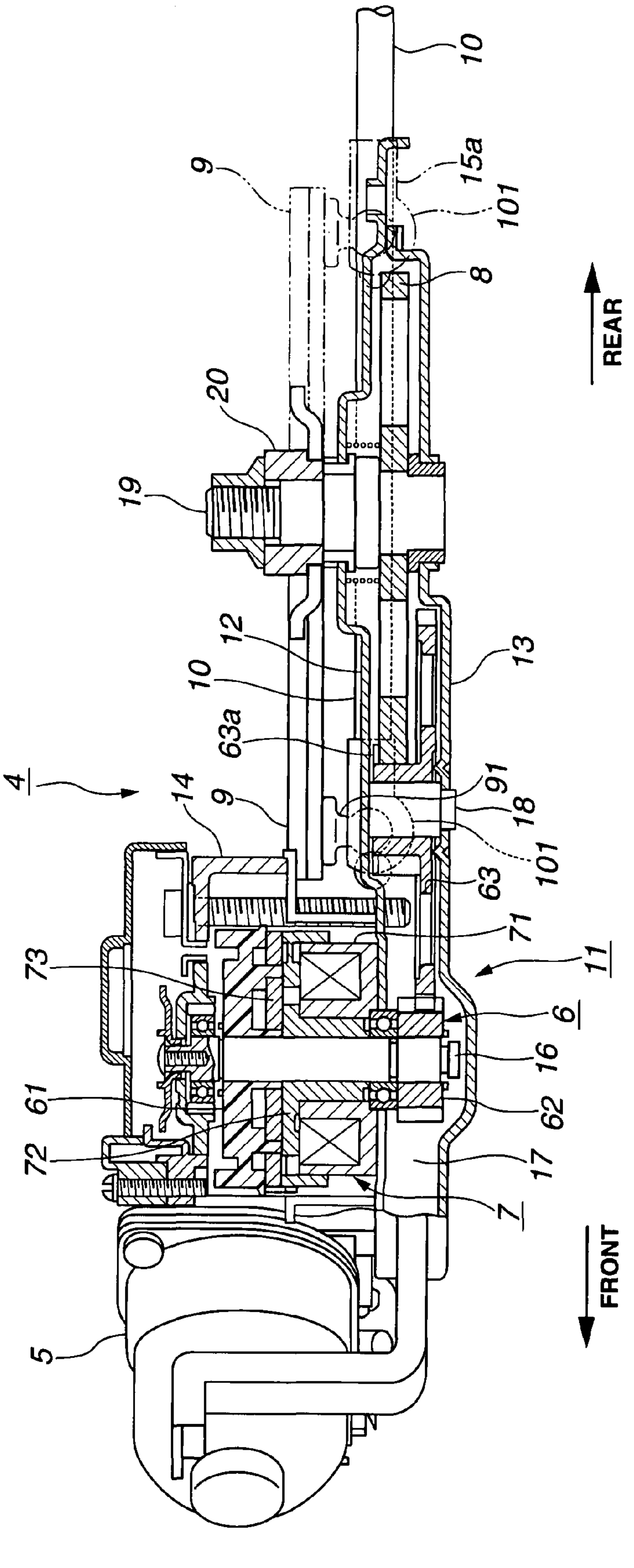
FIG. 3 is an upside-down illustration of a sectional view taken along the line III-III of FIG. 2.

Referring to FIGS. 2 and 3, there is shown the detail of the electric actuator 4 of the present invention.

For easy understanding of construction and arrangement of the electric actuator 4, the view of FIG. 3 is an upside-down illustration of a sectional view taken along the line III-III of FIG. 2.

As is seen from FIGS. 2 and 3, the electric actuator 4 comprises a metal case 11 that is fixed to a bottom wall of the roof structure 2 (see FIG. 1) for mounting therein and thereto various elements which will be described in the following.

That is, an electric motor 5 is mounted to the case 11, which produces a power when electrically energized. A speed reduction mechanism 6 is mounted in the case 11 and operatively connected to an output member of the electric motor 5. An electromagnetic clutch 7 is mounted to the case 11 and selectively opens and closes a power transmission path defined by the speed reduction mechanism 6.

An output sector gear 8 is rotatably mounted in the case 11 and operatively connected to an output member of the speed reduction mechanism 6. An output arm 9 is connected at its inner end to a center portion of the output sector gear 8 through an output shaft 19 and thus the output arm 9 and output sector gear 8 rotate together like a single unit.

A connecting rod 10 is pivotally connected at its left one end to an outer end of the output arm 9 and extends toward the pivotal back door 1 (see FIG. 1).

As is seen from FIGS. 2 and 3, particularly FIG. 3, the case 11 comprises an upper wall portion 12 and a lower wall portion 13 which are coupled to constitute a gear housing structure (12, 13).

The case 11 further comprises a clutch housing structure 14 that is secured to an upper surface of the upper wall portion 12 and houses therein the electromagnetic clutch 7 and part of the speed reduction mechanism 6.

As is seen from FIG. 3, the upper and lower wall portions 12 and 13 are laid to overlap each other in a vertical direction.

As is seen from the drawings, particularly FIG. 2, mutually mated peripheries of the upper and lower wall portions 12 and 13 are provided with four brackets 15*a*, 15*b*, 15*c* and 15*d* that are secured to the bottom wall (see FIG. 1) of the roof structure 2 through respective bolts (not shown).

As is seen from FIGS. 2 and 3, the speed reduction mechanism 6 comprises an input shaft 16 that extends vertically in the clutch housing structure 14, a worm wheel 61 that is rotatably held by the input shaft 16 and meshed with a worm 52 fixed to an output shaft 51 of the electric motor 5, a pinion 62 that is received in a gear receiving space 17 of the gear housing structure (12, 13) and connected to a lower end (see FIG. 3) of the input shaft 16 that projects into the gear receiving space 17, a vertically extending intermediate shaft 18 that is received in the gear receiving space 17, and an intermediate gear 63 that is rotatably held by the intermediate shaft 18 and meshed with the pinion 62. As will be described in detail hereinafter, the intermediate gear has a smaller diameter gear 63*a* meshed with the output sector gear 8.

As is seen from FIG. 3, the electromagnetic clutch 7 comprises an annular electromagnet 71 that is installed in the clutch housing structure 14 in a manner to surround the input shaft 16 and secured to the upper surface of the upper wall portion 12, a rotor 72 of magnetic material that is tightly disposed on the input shaft 16 and has a circular flange portion (no numeral) that faces upward, and an armature 73 of magnetic material that rotates together with the worm wheel 61 and is rotatably and axially movably held by the input shaft 16 while facing an upper flat part of the circular flange portion of the rotor 72, as shown.

That is, when the electromagnet 71 is energized, the armature 73 is shifted down and fixed to the rotor 72. With this, a power transmission path of the speed reduction mechanism 6 (that is, the power transmission path from the worm wheel 61 to the pinion 62) is established. While, when the electromagnet 71 is de-energized, the armature 73 is released from the rotor 72, and thus the power transmission path is blocked.

The output sector gear 8 is connected to an output shaft 19 that extends vertically in FIG. 3 in the gear receiving space 17 of the gear housing structure (12, 13). The output sector gear 8 is meshed with the above-mentioned smaller diameter gear 63*a* of the intermediate gear 63.

As is understood from FIG. 2, due to rotation of the intermediate gear 63, the output sector gear 8 is rotated between a full-closed position "C" as shown by a solid line and a full-open position "O" as shown by a phantom line. These two positions "C" and "O" have a difference of about 90 degrees in rotation angle.

As is best seen from FIG. 3, an upper portion of the output shaft 19 projects upward from the upper wall portion 12, and the output arm 9 is secured at its inner end to the projected upper portion of the output shaft 19 through a cylindrical metal spacer 20.

Thus, as is seen from FIG. 2, together with the output sector gear 8, the output arm 9 is rotated between a full-closed position "c" as shown by a solid line and a full-open position "o" as shown by a phantom line.

As will be understood from the foregoing description, the output arm 9 is placed above the upper wall portion 12 of the gear housing structure (12, 13). More specifically, as is understood from FIG. 3, the output arm 9 is placed at the same side of the case 11 as the clutch housing structure 14.

As is seen from FIG. 3, to a lower surface of an outer end of the output arm 9, there is provided a spherical pin 91. The spherical pin 91 is rotatably received in a spherical grip portion 101 that is provided on one or left end of the connecting rod 10. The pin 91 and the grip portion 101 thus constitute a so-called universal joint. A thickness of the universal joint is smaller than that of the case 11.

As is seen from FIG. 2, when the output arm 9 turns between the full-closed position "c" and the full-open position "o", a unit including the grip portion 101 and the connecting rod 10 travels beside the case 11. In other words, the unit is prevented from traveling on or over the case 11.

As will be understood from FIG. 3, the connecting rod 10 has a leading (or right) end that is pivotally connected to the pivotal back door 1 at a position remote from the hinged upper part of the back door 1.

As is seen from FIG. 3, the connecting rod 10 is arranged to travel beside the case 11 without projecting upward and downward from case 11.

Under operation of the electric actuator 4, the connecting rod 10 is forced to move linearly in a fore-and-aft direction. However, in the present invention, such movement of the connecting rod 10 is carried out beside the case 11 along a predetermined traveling path that does not project over respective imaginary planes of the upper and lower wall portions 12 and 13 of the gear housing structure (12, 13). Preferably, the predetermined traveling path has a thickness that is smaller than that of the gear housing structure (12, 13).

As is seen from FIG. 2, the pinion 62 (and thus the worm wheel 61), the intermediate gear 63 and the output sector gear 8 are arranged in tandem on an imaginary straight line "A" that is generally in parallel with the predetermined traveling path of the connecting rod 10. Of course, the imaginary straight line "A" is a line that passes through respective centers of the input shaft 16, intermediate shaft 18 and output shaft 19.

As is seen from FIG. 2, the electric motor 5 is slanted with respect to the imaginary straight line "A". That is, the electric motor 5 is arranged on an extended part "A1" of the imaginary straight line "A" having an axis "B" of the output shaft 51 thereof inclined relative to the imaginary straight line "A". With this arrangement, the electric motor 5 can be compactly mounted to the case 11.

For the above-mentioned arrangement, an entire construction of the electric actuator 4 has a reduced thickness and a reduced width, and thus the electric actuator 4 can be readily mounted in a limited space of the roof structure 2.

Preferably, the inclination of the electric motor 5 relative to the imaginary straight line "A" is so made that when the output arm 9 is in its full-close position "c", the axis "B" of the output shaft 51 and an imaginary straight line "D" that passes through respective centers of the output shaft 20 and spherical pin 91 intersect on an imaginary plane.

In the following, operation of the electric actuator 4 of the present invention will be described with the aid of the drawings, especially FIG. 2.

For ease of understanding, the description will be commenced with respect to the full-closed condition of the pivotal back door 1 wherein the back door 1 fully closes the open rear end of the vehicle body.

Under this condition, the electromagnetic clutch 7 and the electric motor 5 are kept OFF, and the output arm 9 (see FIG. 2) assumes the full-closed position "c" causing the connecting rod 10 to take its leftmost position in FIG. 2.

When now a control switch (not shown) mounted in a passenger room of the vehicle or a remote control switch (not shown) is turned to a door open position, the electromagnetic clutch 7 is energized establishing the power transmission path of the speed reduction mechanism 6, and then the electric motor 5 is energized to rotate in a normal direction.

Upon this, the power of the electric motor 5 is transmitted through the speed reduction mechanism 6 and output sector gear 8 to the output arm 9. Thus, the output arm 9 is turned in a counterclockwise direction in FIG. 2 from the full-closed position "c" toward the full-open position "o" while pushing the connecting rod 10 rightward. Due to the rightward movement of the connecting rod 10, the back door 1 is gradually opened, and when, due to continuous energization of the electric motor 5, the output arm 9 comes to the full-open position "o", the pivotal back door 1 is fully opened as is shown by a phantom line in FIG. 1.

When the back door 1 is lifted up to the full-open position, a door position sensing means (not shown) issues a stop signal to stop energization of the electric motor 5 and electromagnetic clutch 7. Because of the nature possessed by the speed reduction mechanism 6, the weight of the back door 1 does not induce a downward movement of the same. Thus, the back door 1 is kept in its full-open position even when the electric motor 5 and electromagnetic clutch 7 are de-energized.

When now the control switch or the remote control switch is turned to a door close position, the electromagnetic clutch 7 is energized establishing the power transmission path of the speed reduction mechanism 6, and then the electric motor 5 is energized to rotate in a reversed direction.

Upon this, the power of the electric motor 5 with a reversed rotational direction is transmitted through the speed reduction mechanism 6 and output sector gear 8 to the output arm 9. Thus, the output arm 9 is turned in a clockwise direction in FIG. 2 from the full-open position "o" toward the full-closed position "c" while pulling the connecting rod 10 leftward. Due to the leftward movement of the connecting rod 10, the back door 1 is gradually lowered, and when, due to continuous energization of the electric motor 5, the output arm 9 comes back to the full-closed position "c", the back door 1 is fully closed as is shown by a solid line in FIG. 1.

In the foregoing description, the electric actuator 4 is applied to the pivotal back door 1 of the motor vehicle for opening and closing the same. Of course, the electric actuator 4 is applicable to other doors, such as, a trunk lid and a side door of motor vehicles.

In the foregoing description, the electric actuator 4 is mounted on the vehicle body (more specifically, in the roof structure 2). However, if desired, the electric actuator 4 may be mounted on the pivotal back door 1. In this modification, the leading end of the connecting rod 10 is pivotally connected to the vehicle body.

In the foregoing description, the electric actuator 4 is so arranged that the input shaft 16, intermediate shaft 18 and output shaft 19 extend vertically. However, if desired, the electric actuator 4 may be so arranged that such shafts 16, 18 and 19 extend horizontally.

In the foregoing description, only one electric actuator 4 is employed for actuating the pivotal back door 1. However, if desired, additional electric actuator may be further employed for assuring the open and close movement of the back door 1.

The entire contents of Japanese Patent Application 2007-004118 filed Jan. 12, 2007 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An electric actuator for actuating a pivotal door of a motor vehicle, comprising:

a case mounted to one of the motor vehicle and the pivotal door, the case having therein a gear receiving space;

an electric motor mounted to the case;

a speed reduction mechanism installed in the gear receiving space of the case and driven by the electric motor;

an output gear rotatably received in the gear receiving space of the case and driven by the speed reduction mechanism;

an output arm placed above the case and connected to the output gear through an output shaft that passes through an upper wall portion of the case; and a connecting rod having one end pivotally connected to the output arm and an other end pivotally connected to the other of the motor vehicle and the pivotal door, wherein the connecting rod is arranged beside the case in a manner to avoid overlapping thereof with the case in a direction that is perpendicular to a direction in which the connecting rod is moved by the output arm, wherein the speed reduction mechanism includes:

a pinion driven by the electric motor; and an intermediate gear having a larger diameter gear part meshed with the pinion and a smaller diameter gear part meshed with the output gear, wherein the pinion, the intermediate gear, and the output gear are arranged in tandem on an imaginary straight line that is generally in parallel with the direction in which the connecting rod is moved by the output arm, wherein the electric motor is arranged on an extension part of the imaginary straight line, and wherein the electric motor has an output shaft whose axis is inclined relative to the imaginary straight line, so that the electric motor has a reduced dimension in a direction that is perpendicular to the imaginary straight line.

2. An electric actuator as claimed in claim 1, further comprising an electromagnetic clutch that is mounted to the upper wall portion of the case to selectively open and close a power transmission path defined by the speed reduction mechanism.

3. An electric actuator as claimed in claim 2, in which the electromagnetic clutch comprises:

an annular electromagnet that surrounds an input shaft;

a rotor secured to the input shaft to rotate therewith; and an armature that rotates together with a worm wheel meshed with a worm driven by the electric motor, the armature being rotatably and axially movably held by the input shaft while facing the rotor.

4. An electric actuator as claimed in claim 1, further comprising a universal joint by which the output arm and the connecting rod are pivotally connected, the universal joint having a thickness smaller than that of the case.

5. An electric actuator as claimed in claim 4, in which the universal joint comprises:

a spherical pin provided to a lower surface of an outer end of the output arm; and a spherical grip portion provided on an end of the connecting rod, wherein the spherical pin is rotatably received in the spherical grip portion.

* * * * *